(12) United States Patent
Sakai et al.

(10) Patent No.: US 8,160,724 B2
(45) Date of Patent: *Apr. 17, 2012

(54) INFORMATION PROCESSING APPARATUS, INFORMATION PROCESSING METHOD, RECORDING MEDIUM AND PROGRAM

(75) Inventors: Shimon Sakai, Kanagawa (JP); Naoki Ode, Chiba (JP); Tomohiro Taira, Tokyo (JP); Yuji Ishimura, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,128

(22) Filed: Oct. 25, 2010

(65) Prior Publication Data

US 2011/0040551 A1 Feb. 17, 2011

Related U.S. Application Data

(62) Division of application No. 11/505,262, filed on Aug. 16, 2006, now Pat. No. 7,853,334.

(30) Foreign Application Priority Data

Aug. 19, 2005 (JP) ................................. 2005-238282

(51) Int. Cl.
G06F 9/44 (2006.01)
G06F 3/00 (2006.01)
G05B 15/00 (2006.01)

(52) U.S. Cl. ................. 700/1; 717/100; 717/120; 710/5
(58) Field of Classification Search .................. 717/100, 717/120; 700/1; 710/5
See application file for complete search history.

(56) References Cited

U.S. PATENT DOCUMENTS

| 7,231,642 B2* | 6/2007 | Araki et al. ............... 719/320 |
| 7,421,546 B2* | 9/2008 | Odent et al. .............. 711/156 |
| 7,500,209 B2* | 3/2009 | Raghavan et al. .......... 716/106 |
| 2003/0154319 A1* | 8/2003 | Araki et al. ............... 709/310 |
| 2004/0098253 A1* | 5/2004 | Balentine et al. ........... 704/215 |
| 2005/0182638 A1* | 8/2005 | Odent et al. ................ 705/1 |

(Continued)

FOREIGN PATENT DOCUMENTS

EP 0 822 484 2/1998

(Continued)

OTHER PUBLICATIONS

Venner, B: "Inside The Java 2 Virtual Machine", Jan. 6, 2000, McGraw-Hill Companies. XP002409258.

(Continued)

*Primary Examiner* — Ronald Hartman, Jr.
(74) *Attorney, Agent, or Firm* — Lerner, David, Littenberg, Krumholz & Mentlik, LLP

(57) ABSTRACT

An information processing apparatus which is capable of executing applications includes first control means for controlling a system of the information processing apparatus and second control means for controlling the execution of the applications, and the second control means has state transition control means for defining states of application not dependent on the system and controlling transitions of the defined states and conversion means for converting a command into a format which can be recognized by the system when the command instructing a state transition to the state transition control means is issued.

2 Claims, 7 Drawing Sheets

U.S. PATENT DOCUMENTS

| | | | |
|---|---|---|---|
| 2006/0075360 A1* | 4/2006 | Bixler | 715/805 |
| 2007/0130140 A1* | 6/2007 | Cytron et al. | 707/6 |
| 2008/0208792 A1* | 8/2008 | Aikens et al. | 707/1 |
| 2008/0263524 A1* | 10/2008 | Adams et al. | 717/127 |
| 2009/0006067 A1* | 1/2009 | Raghavan et al. | 703/16 |
| 2009/0112418 A1* | 4/2009 | Buur et al. | 701/55 |

FOREIGN PATENT DOCUMENTS

| | | |
|---|---|---|
| JP | 02059816 A | 2/1990 |
| JP | 2002-149418 A | 5/2002 |
| JP | 2005038011 A | 2/2005 |
| JP | 2005157425 A | 6/2005 |

OTHER PUBLICATIONS

Office Action from Japanese Application No. 2005-238282, dated Mar. 2, 2010.

* cited by examiner

FIG. 5

| STATES DEFINED BY STATE DEFINITION MODULE | COMMANDS WHICH CAN BE RECOGNIZED BY APPLICATION | COMMANDS WHICH CAN BE RECOGNIZED BY SYSTEM |
|---|---|---|
| STATE IN WHICH MEDIUM IS NOT SET | OPEN ( ) | X X X X |
| | DESTROY ( ) | X X X X |
| STOP STATE | CLOSE ( ) | X X X X |
| | PLAY ( ) | X X X X |
| | SEEK ( ) | X X X X |
| PLAYING STATE | STOP ( ) | X X X X |
| | PLAY ( ) | X X X X |
| | SEEK ( ) | X X X X |
| | PAUSE ( ) | X X X X |
| PAUSE STATE | STOP ( ) | X X X X |
| | PLAY ( ) | X X X X |
| | SEEK ( ) | X X X X |

INFORMATION PROCESSING APPARATUS, INFORMATION PROCESSING METHOD, RECORDING MEDIUM AND PROGRAM

CROSS REFERENCE TO RELATED APPLICATIONS

This application is a divisional of U.S. application Ser. No. 11/505,262, filed on Aug. 16, 2006, the disclosure of which is incorporated herein by reference.

The present invention contains subject matter related to Japanese Patent Application JP 2005-238282 filed in the Japanese Patent Office on Aug. 19, 2005, the entire contents of which being incorporated herein by reference.

BACKGROUND OF THE INVENTION

1. Field of the Invention

The invention relates to an information processing apparatus, an information processing method, a recording medium and a program, particularly relates to the information processing apparatus, the information processing method, the recording medium and the program capable of improving portability of applications.

2. Background Art

In related arts, there is a technology that, when an application is ported to a different platform, the same menu can be created when porting the application by using a GUI (graphic user interface) definition file of the application of an original port in a destination port. JP-A-2002-149418 is an example of the background art.

SUMMARY OF THE INVENTION

However, when an application is ported to a different platform, in an actual application, particularly in a multimedia application, it is difficult to say that the application has been ported only by porting the GUI.

It is necessary to increase portability of applications for different platforms by increasing portability of the applications including not only the GUI but also behavior of the application, managing the behavior of the application at an upper layer such as management of state transitions.

The invention has been made in view of the above status, and it is desirable to improve portability of applications.

An information processing apparatus according to an embodiment of the invention which is capable of executing applications includes first control means for controlling a system of the information processing apparatus, second control means for controlling the execution of the applications, in which the second control means has state transition control means for defining states of the application not dependent on the system and controlling transitions of the defined states and conversion means for converting a command into a format which can be recognized by the system when the command instructing a state transition to the state transition control means is issued.

It is possible to allow the state transition control means to judge whether the state transition is possible or not by the command, based on the defined state when the command instructing the state transition is issued, and it is possible to allow the conversion means to convert the command into the format which can be recognized by the system only when the state transition is judged to be possible by the state transition control means.

It is possible to allow the conversion means to possess information showing relation between commands which can be recognized by the system and by the state transition control means respectively.

An information processing method according to an embodiment of the invention is the information processing method of an information processing apparatus which is capable of executing applications, and the method includes steps of controlling a system of the information processing apparatus, controlling execution of the applications, receiving a command instructing a state transition of the application, judging whether a transition of a defined state is possible or not in accordance with the command, based on the state definition of the application not dependent on the system, and converting the command into a format which can be recognized by the system when the state definition is judged to be possible.

A program according to an embodiment of the invention is the program which is incorporated in a designated system and can be executed by a computer controlling execution of applications not dependent on the system, which allows the computer to execute processing including steps of receiving a command instructing a state transition of the application, judging whether a transition of a defined state is possible or not in accordance with the command, based on the state definition of the application not dependent on the system, and converting the command into a format which can be recognized by the system when the state transition is judged to be possible.

In the embodiment of the invention, states of the applications not dependent on the system are defined, the defined state transitions are controlled, and when a command instructing a state transition is issued, the command is converted into a format which can be recognized by the system.

BRIEF DESCRIPTION OF THE DRAWINGS

FIG. 5 is a view explaining a corresponding table showing correspondence between state definitions of an application and commands (functions) which can be recognized by the application and a system;

DETAILED DESCRIPTION OF THE INVENTION

Figure 1:
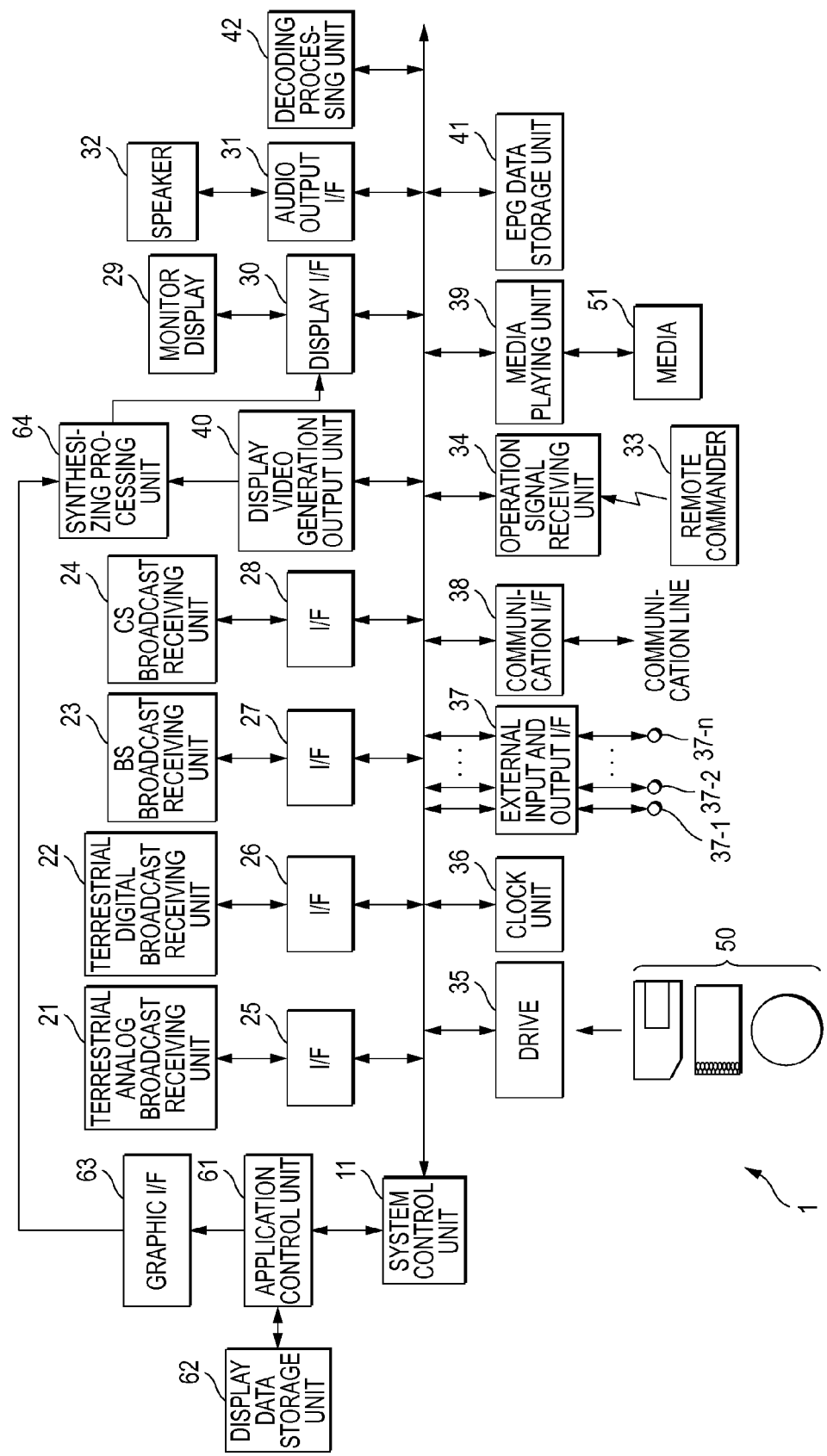
FIG. 1 is a block diagram showing a configuration of an information processing apparatus to which an embodiment of the invention is applied.

Embodiments of the invention will be described below, and the correspondence between constituent features of the invention and embodiments described in detailed description of the invention is exemplified as follows. The description is made for confirming that embodiments which support the invention are written in the detailed description of the invention. Therefore, if there is an embodiment that is written in the detailed description of the invention but not written here as the embodiment corresponding to a constituent feature of the invention, that does not mean that the embodiment does not correspond to the constituent feature. Conversely, if an embodiment is written here as the embodiment corresponding to a constituent feature, that does not mean that the embodiment does not correspond to a constituent feature other than that constituent feature.

An information processing apparatus according to an embodiment of the invention is the information processing apparatus (for example, an information processing apparatus 1 in FIG. 1) capable of executing applications, and the apparatus includes first control means (for example, a system control unit 11 in FIG. 1) for controlling a system of the information processing apparatus and second control means (for example, an application control unit 61 in FIG. 1) for controlling the execution of the applications (for example, applications 91 in FIG. 2), in which the second control means has state transition control means (for example, a state definition module 92 in FIG. 2) for defining states of application not dependent on the system (for example, states shown in FIG. 3 or FIG. 4), and controlling transition of the defined states and conversion means (for example, an interface module in FIG. 2) for converting a command into a format which can be recognized by the system when the command instructing a state transition to the state transition control means is issued.

The conversion means can possess information (for example, a correspondence table shown in FIG. 5) showing relation between commands which can be recognized by the system and by the state transition control means respectively.

Figure 7:
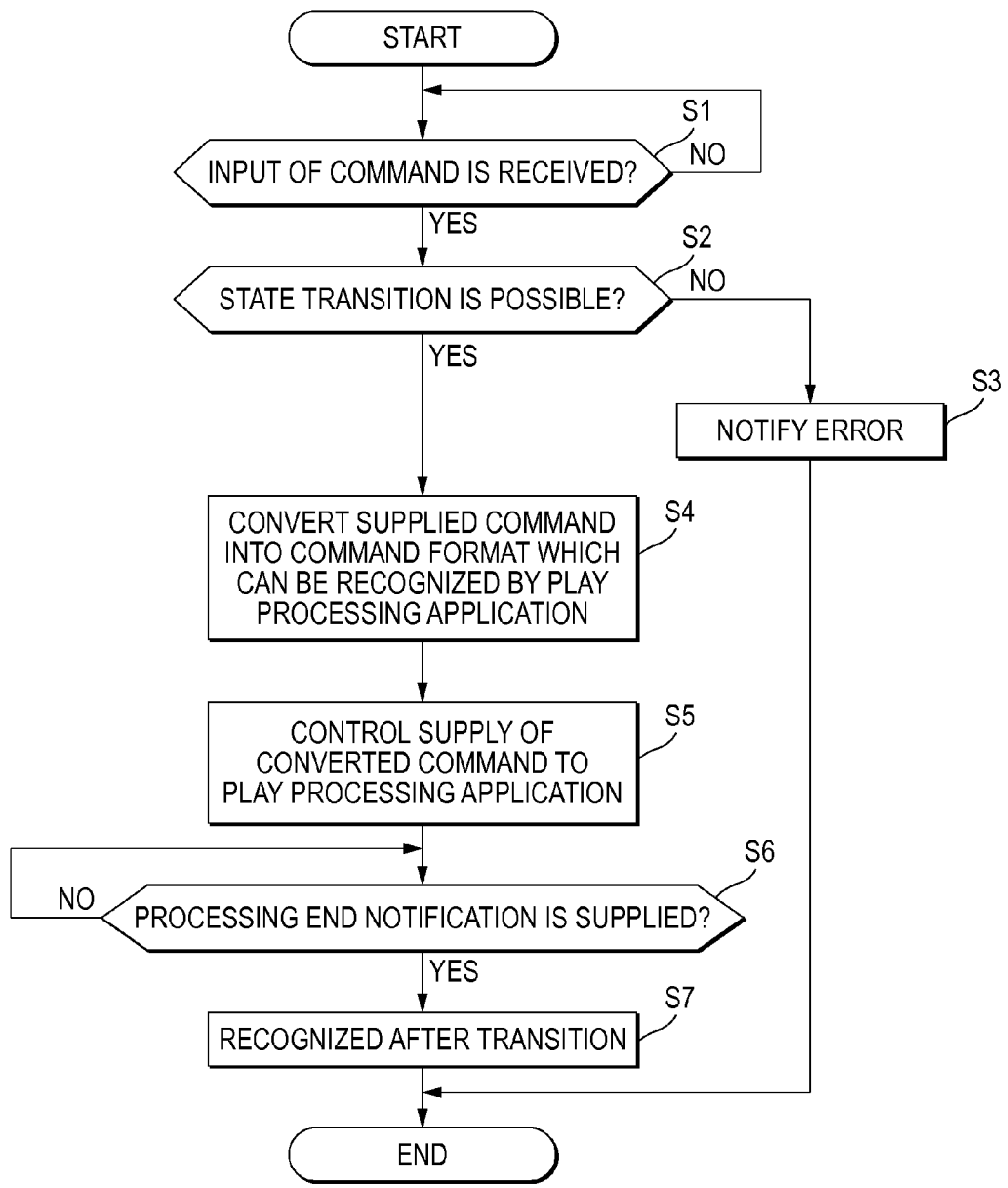
FIG. 7 is a flowchart for explaining processing to which an embodiment the invention is applied.

An information processing method according to an embodiment of the invention is the information processing method of an information processing apparatus (for example, an information processing apparatus 1 in FIG. 1) capable of executing applications, and the method includes steps of controlling a system of the information processing apparatus (for example, system control means 11 in FIG. 1), controlling (for example, an application control unit 61 in FIG. 1) the execution of the applications (for example, an applications 91 in FIG. 2), receiving a command instructing a state transition of the application (for example, a process of a step S1 in FIG. 7), judging whether a transition of a defined state is possible or not (for example, a process of a step S2 in FIG. 7) in accordance with the command, based on the state definition (for example, states shown in FIG. 3 or FIG. 4) of the application not dependent on the system, and converting the command into a format which can be recognized by the system when the state transition is judged to be possible (for example, a process of a step S4 in FIG. 7).

A program according to an embodiment of the invention is a program which is incorporated in a designated system (for example, an information processing apparatus 1 in FIG. 1) and can be executed by a computer (for example, an application control unit 61 in FIG. 1) controlling execution of applications not dependent on the system, which allows the computer to execute processing including steps of receiving a command instructing a state transition of the application (for example, a process of a step S1 in FIG. 7), judging whether a transition of a defined state is possible or not (for example, a process of a step S2 in FIG. 7) in accordance with the command, based on the state definition (for example, states shown in FIG. 3 or FIG. 4) of the application not dependent on the system and converting the command into a format which can be recognized by the system when the state transition is judged to be possible (for example, a process of a step S4 in FIG. 7).

Hereinafter, an embodiment of the invention will be explained with reference to the drawings.

An information processing apparatus 1 to which the invention is applied, shown in FIG. 1 is configured such that respective processing units such as various kinds of broadcast receiving units, a video output display unit, an audio output unit, an operation input unit are connected to an system bus 12 connected to a system control unit 11 formed by a microcomputer. An application control unit 61 is connected to the system control unit 11, and processing of application programs not dependent on the apparatus or the system and GUI display concerning these applications are controlled by the application control unit 61.

The system control unit 11 includes a CPU (Central Processing Unit), a program ROM (Read Only Memory), a work area RAM (Random Access Memory) and the like, executing various control processing in accordance with programs written in the program ROM, while using the work area RAM.

As broadcast receiving units, a terrestrial analog broadcast receiving unit 21, a terrestrial digital broadcast receiving unit 22, a BS broadcast receiving unit 23, a CS broadcast receiving unit 24 are provided, respectively connected to the system bus 12 through interfaces (I/F) 25 to 28. Each of broadcast receiving units 21 to 24 selects a broadcast program according to an operation of channel selection by a user inputted through a remote commander 33 from broadcast signals to be a target, which have been received from an antenna not shown, and transmits video data and audio data of the selected broadcast program or data received from data broadcasting to the system bus 12 through the interfaces (I/F) 25 to 28.

The terrestrial analog broadcast receiving unit 21 selects and receives an existing terrestrial analog television broadcast signal and outputs a video signal (an image signal) and an audio signal to the system bus 12 through the interface 25. The terrestrial digital broadcast receiving unit 22 corresponds to digital television broadcasting, digital audio broadcasting and data broadcasting, which selects and receives a broadcast program in accordance with an operation of channel selection by a user and decodes the broadcast program to output data such as a video signal (an image signal), an audio signal and EPG (Electric Programming Guide) data to the system bus 12 through the interface 26. The BS broadcast receiving unit 23 corresponds to BS television broadcasting, a BS audio broadcasting and data broadcasting, which selects and receives a broadcast program in accordance with an operation of channel selection by a user and decodes the broadcast program to output data such as an video signal (an image signal), an audio signal and EPG data to the system bus 12 through the interface 27. The CS broadcast receiving unit 24 corresponds to CS television broadcasting, CS audio broadcasting and data broadcasting, which selects and receives a broadcast program in accordance with an operation of channel selection by a user and decodes the broadcast program to output data such as a video signal (an image signal), an audio signal and EPG data to the system bus 12 through the interface 28.

As the video output display unit, a monitor display 29 including a CRT (Cathode Ray Tube), a LCD (liquid crystal display and the like is connected to the system bus 12 through a display interface 30. As the audio output unit, a speaker 32 is connected through an audio output interface 31. Also, as the operation input unit, a remote commander 33 is provided, and an operation signal receiving unit 34 receiving an operation signal from the remote commander 33 is connected to the system bus 12. It is preferable that the remote commander 33 has right and left directions instruction operation buttons, upper and lower directions instruction operation buttons, a "home" button and a "decision" button or it is configured to be able to perform such operation inputs. Specifically, the remote commander 33 is configured to include an input device capable of performing selection instruction and the like by button operation by a user on a later-described GUI (Graphic User Interface) window which is displayed in the monitor display 29 using, for example, various buttons, a cross-shape upper-and-lower right-and-left directions instruction button, a joystick and the like.

A drive 35, a clock unit 36, an external input and output interface 37, a communication interface 38, a media playing unit 39, a display video generation output unit 40 and an EPG data storage unit 41 are further connected to the system bus 12.

The drive 35 is for reading data from removable media 50 to be inserted thereinto, such as an optical disk, a magnetic disk, a magneto-optical disk or a semiconductor memory, or for writing data in the removable media 50.

The clock unit 36 provides information of present time or calendar information. The clock unit 36 is also used for setting reservation of broadcast programs and counting of time of various timers corresponding to the reservation setting. The external input and output interface 37 includes external input and output terminals 37-1 to 37-n such as a video input and output terminal, an audio input and output terminal, a USB (Universal Serial Bus) terminal, exchanging signals between respective input and output terminals and the system bus 12. The communication interface 38 is connected to communication lines, which is used for transmitting a response signal to a predetermined address or acquiring a data broadcast content existing at a server apparatus through a network when a data broadcast program is bidirectional broadcasting. The communication interface 38 is used for downloading data such as web contents through Internet, or transmitting predetermined information through Internet.

The EPG data storage unit 41 stores data of Electric Programming Guide (EPG data) supplied from the broadcast receiving units 21 to 24 through the interfaces 25 to 28 and the system bus 12 in a built-in memory. As the EPG data, in the case of terrestrial analog broadcasting, the one superimposed in a vertical blanking period of a television broadcast signal is used, and in the case of digital broadcasting, the one transmitted as data broadcasting is used. The EPG data includes data such as a broadcast station name, a broadcast program name, a program start time, a program end time, performers, and a program category. The EPG data stored in the EPG data storage unit 41 is updated so as to be latest data.

As the EPG data, it may be possible that the one superimposed on a broadcast signal is not used, but data is acquired, for example, from an EPG data providing server by accessing the EPG data providing server connected to Internet using the communication interface 38.

The media playing unit 39 is configured such that media 51 including a magnetic tape, an optical disk, a magneto-optical disk and a semiconductor memory and the like are mounted thereon, which plays contents including video data (moving picture data or still picture data), music data and the like recorded in the mounted media 51. The media playing unit 39 supplies the played contents to the display video generation output unit 40, or supplies contents to the decoding processing unit 42 in the case that the recorded content is encoded.

The decoding processing unit 42 decodes supplied video data or audio data, and supplies it to the display video generation output unit 40 or the audio output interface 31.

The display video generation output unit 40 receives control by the system control unit 11 and generates video to be displayed in the monitor display 29. The display video generation output unit 40 stores video data received from the broadcast receiving units 21 to 24, or video data decoded by the decoding processing unit 42 in a built-in buffer, and supplies data to the display interface 30 through the system bus 12 when synthesis is not necessary, and supplies data to a synthesizing processing unit 64 when synthesis is necessary.

The application control unit 61 executes application programs not dependent on the system, controlling display processing concerning these application programs. A display data storage unit 62 stores data for display such as data of icons forming the later-described GUI, data for displaying channels and other character data. The application control unit 61 calls data of icons and the like stored in the display data storage unit 62 and generates data (later-described GUI parts) corresponding to characters or signs for display GUI to supply data to the synthesizing processing unit 64 through a graphic interface 63.

The synthesizing processing unit 64 receives the supply of data corresponding to characters or signs for GUI display (for example, various items used for GUI display, so-called GUI parts and the like) from the graphic interface 63, and stores data in a built-in on-screen buffer as on-screen display (OSD) data. The on-screen display data is data displayed by being superimposed on images of played video to be displayed on the window of the monitor display 29. That is, when the GUI is displayed, the GUI is superimposed on the played video as the OSD, therefore, display will be the one in which images of the played video is transparently seen under the GUI display.

The synthesizing processing unit 64 synthesizes data stored in the output buffer with the on-screen display data storied in the on-screen display buffer, and supplies the synthesized data to the monitor display 29 through the display interface 30 to be displayed.

Figure 2:
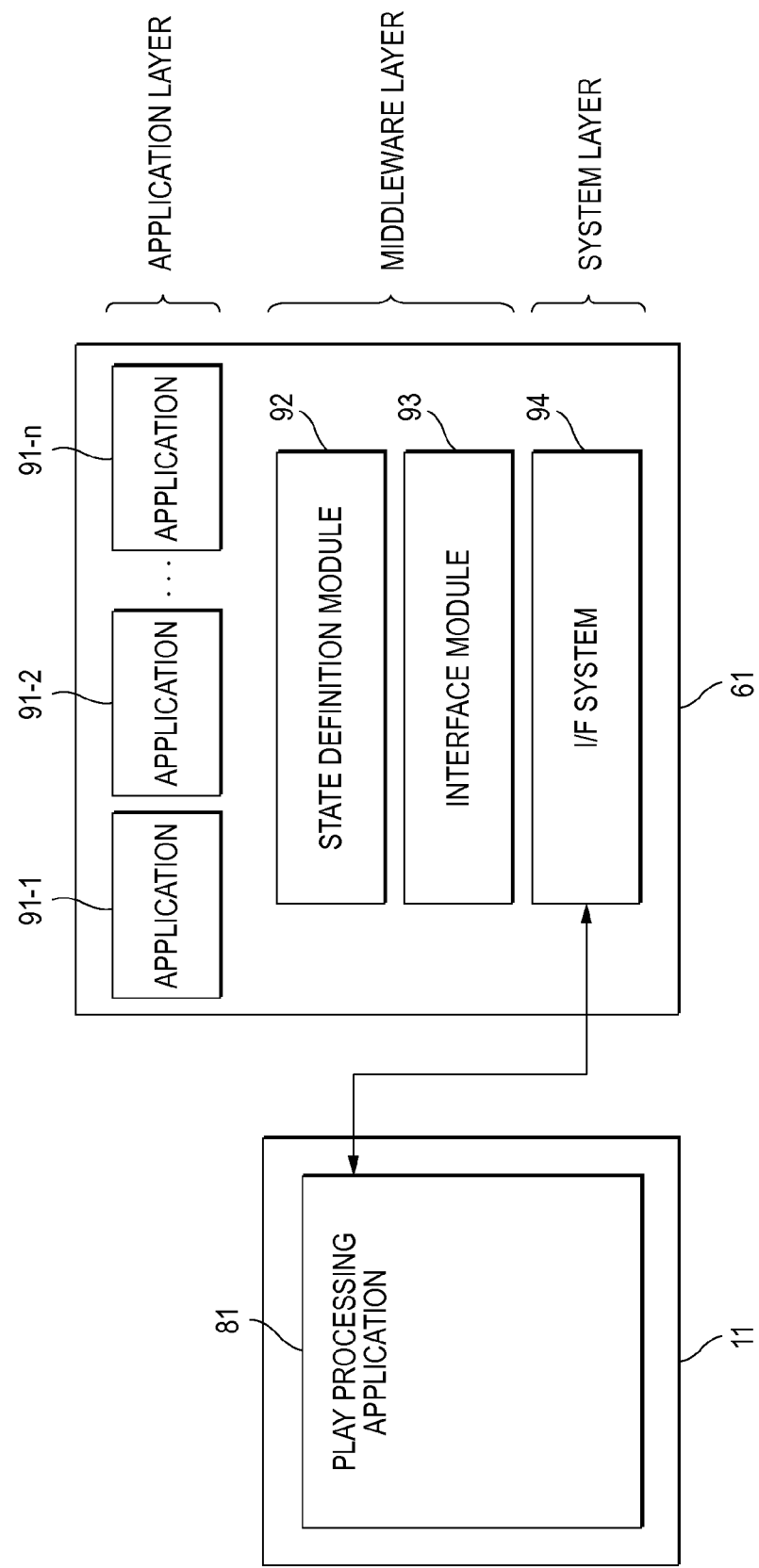
FIG. 2 is a diagram explaining a software stack of the information processing apparatus to which an embodiment of the invention is applied.

FIG. 2 is a module configuration diagram (software stack) showing functions included in the system control unit 11 and the application control unit 61 in FIG. 1.

In the system control unit 11, an application for controlling operations of respective units connected to the system bus 12. Specifically, in the system control unit 11, a play processing application 81 executing processing of reproducing contents such as moving pictures, music, still pictures and the like by controlling operations of respective units connected to the system bus 12 is performed. The application is an application program which operates depending on the system of the information processing apparatus 1. When the play processing application 81 is executed by the system control unit 11, various processing dependent on the system of the information processing apparatus 1 are executed, for example, data of video, audio, still pictures and the like are read from one of the recording units in the system, decoded at one of the processing units in the system, or copied and moved from one recording area to the other recording area in the system.

On the other hand, the application control unit 61 controls processing of applications 91-1 to 91-n which are not dependent on a platform or a system. The application control unit 61 includes a state definition module 92, an interface module 93, and an interface (I/F) system 94 as functions for using the applications 91-1 to 91-n without depending on the platform or the system.

Specifically, in a software stack in the application control unit 61, at a middleware layer between the interface (I/F) system 94 of a system layer as the lowest layer and the applications 91-1 to 91-n of an application layer as the top layer, the state definition module 92 is provided at the application layer side and the interface module 93 is provided at the system layer side, respectively.

The state definition module 92 packages common parts not dependent on the platform or the system in the applications 91-1 to 91-n such as components or state definition concerning GUI display by the applications 91-1 to 91-n, which is considered to be a module on a so-called framework. The state definition module 92 defines interfaces including events, errors occurring between the applications 91-1 to 91-n and the system, which supplies requests from the applications 91-1 to 91-*n* to the interface system 94 at the system layer through the interface module 93 to supply them to the system control unit 11 (play processing application 81), and receives the supply of requests or notifications from the play processing application 81 though the interface system 94 and the interface module 93 to transmits them to the applications 91-1 to 91-*n*.

Figure 3:
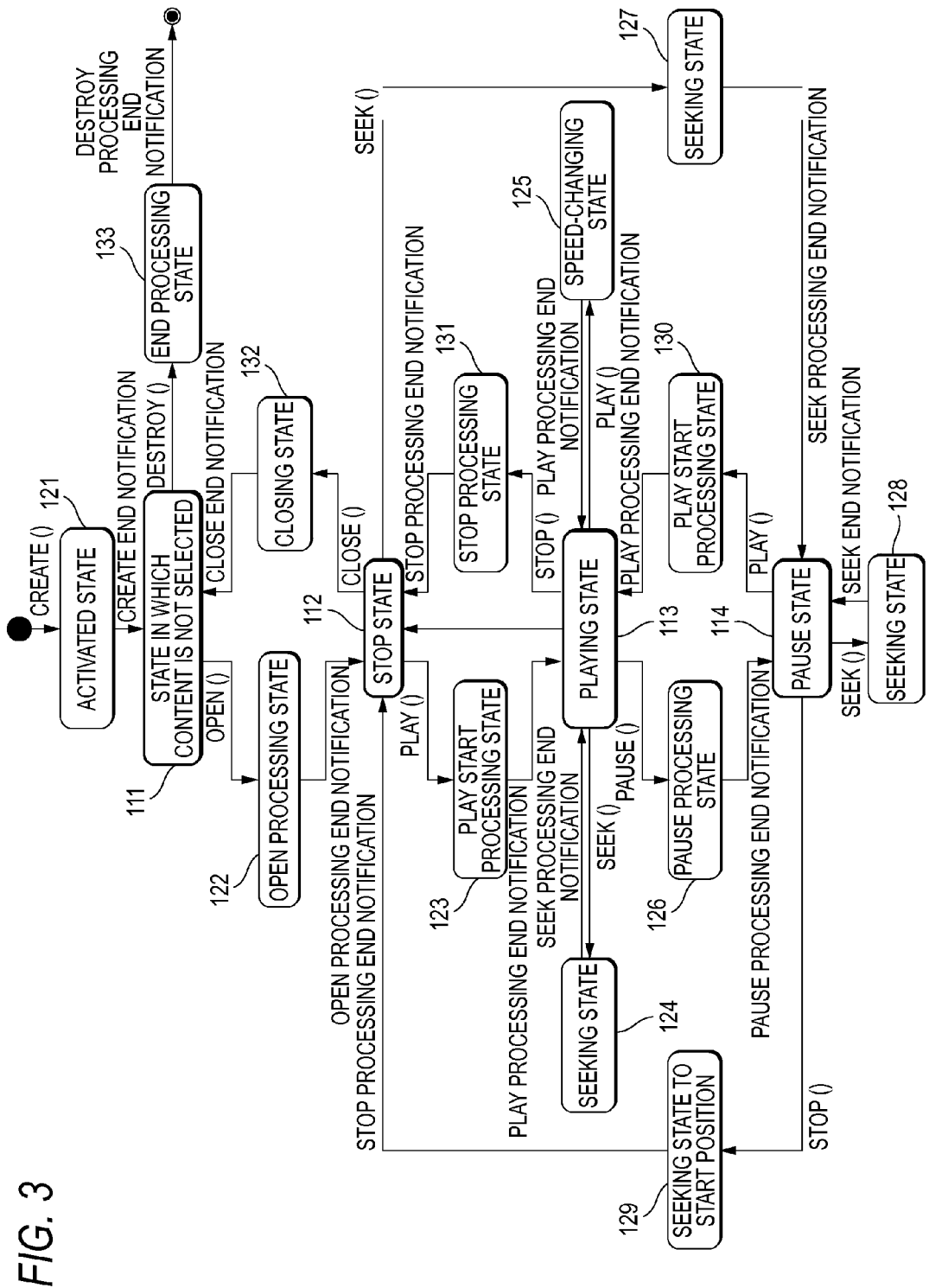
FIG. 3 is a diagram explaining state transitions.
Figure 4:
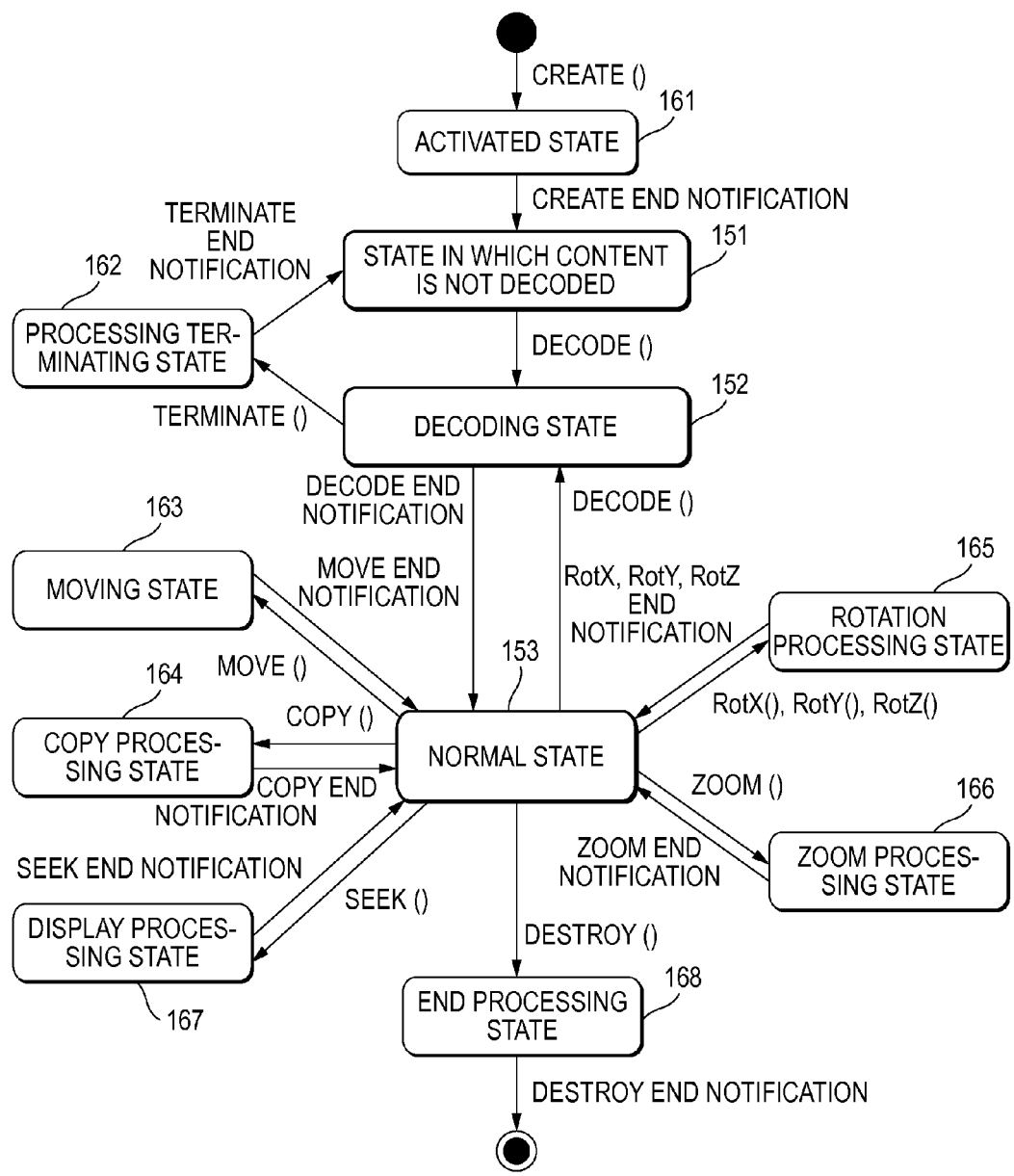
FIG. 4 is a diagram explaining state transitions.

The state definition module 92 manages state transitions commonly defined with respect to the applications 91-1 to 91-*n* as shown in FIG. 3 and FIG. 4.

FIG. 3 is a transition diagram of states which are commonly defined with respect to the applications 91-1 to 91-*n* by the state definition module 92, when moving pictures, video, music and the like are read and played from the media 51 mounted on the media playing unit 39. States surrounded by heavy lines in the drawing show normal states of the system commonly defined with respect to the applications 91-1 to 91-*n* by the state definition module 92, and states surrounded by thin lines show states during transition between normal state and the normal state.

First, one of the applications 91-1 to 91-*n* is extracted and activated by a memory inside the application control unit 61 (Create ( ) command), and when the activation ends via an activated state 121, a state will be a state 111 in which the application has been activated but a content to be played is not selected (any one content is not opened).

In the state 111 in which the content to be played is not selected, in the case that an open command (Open ( )) for selecting any one content and opening a file is supplied, file-open processing is executed and an open processing end is notified via a state during open processing 122, and the state will be a stop state 112. The stop state 112 is a state of waiting for a play command under a state that a play start position is at the head position of the content and a state of waiting for a seek command of other play start positions.

In the stop state 112, when a play command (play ( )) is supplied, play start processing is executed to be a play start processing state 123, then, a play processing end is notified, and the state makes transition to a playing state 113.

In the playing state 113, a command such as seeking (Seek ( )) is supplied, the state returns to the playing state 113 via a seeking state 124. Or, during the playing state 113, in the case that a play command such as double speed play (Play ( ) having different arguments) is supplied, a speed setting is changed in a speed-changing state 125, and the state returns to the playing state 113.

In the playing state 113, when a pause command (Pause ( )) is supplied, the state will be a pause state 114 via a pause processing state 126. Or, during the stop state 112, when the command such as seeking (Seek ( )) is supplied, the state will be the pause state 114 via a seeking state 127. During the pause state 114, when receiving the play start command, the play start position is a position different from a head position.

In the pause state 114, the command such as seeking is supplied, the state returns to the pause state 114 via the seeking state 128. During the pause state 114, when receiving a stop command (Stop ( )), the state makes transition to the stop state 112 via a seeking state to a start position 129. Or, during the pause state 114, when the play command (Play ( )) is supplied, play start processing is executed and the state will be a play start processing state 130, then, a play processing end is notified and the state makes transition to the playing state 113.

During the playing state 113, when receiving the stop command (Stop ( )), the state makes transition to the stop state 112 via a stop processing state 131.

In the stop state 112, when receiving a supply of a command for closing the file of the opened content, the state makes transition to the state 111 in which the content is not selected via a closing state 132. During the state 111 in which the content is not selected, when an end corresponding to one of the application programs 91-*n* (Destroy ( )) is commanded, the application program ends via an end processing state 133.

Accordingly, states of applications 91-1 to 91-*n* are defined without depending on the system by the state definition module 92. Through the state definition is not dependent on the system, the actual operation of the system is different according to cases, for example, a case that a content to be selected is played from media 51 mounted on the media playing unit 39, a case that the content is played from the removable media 50 mounted on the drive 35, or a case that the content is played from not-shown internal recording media. However, the applications 91-1 to 91-*n* are capable of possessing portability not dependent on the system because state transitions not dependent on the system are defined by the state definition module 92.

Next, FIG. 4 is a transition diagram in the case that, after compressed and decoded contents such as still pictures which are commonly defined with respect to applications 91-1 to 91-*n* by the state definition module 92 are decoded in the decoding processing unit 42, play processing and the like are performed. Also in FIG. 4, states surrounded by heavy lines show normal states which are commonly defined with respect to applications 91-1 to 91-*n* by the state definition module 92, and states surrounded by thin lines show transition states between the normal states.

First, one of the applications 91-1 to 91-*n* is extracted and activated by a memory inside the application control unit 61 (Create ( ) command), and when the activation ends via an activated state 161, a state will be a state 151 in which a content is not decoded.

During the state 151 in which the content is not decoded, when any one content is selected and decoding is commanded (Decode ( )), the state makes transition to a decoding state 152. During the decoding state 152, when a decode end notification is supplied, the state is changed to a normal state 153. Or, during the decoding state 152, when termination of decoding processing is commanded (terminate ( )), the state is changed to the state 151 in which the content is not decoded, receiving the terminate end notification via a processing terminating state 162.

During the normal state 153, when any one content is selected and decoding is commanded (Decode ( )), the state is changed to the decoding state 152. During the decoding state 152, when the decode end notification is supplied, the state makes transition to the normal state 153.

During the normal state 153, when any one content is selected and moving is commanded (Move ( )), the state makes transition to the normal state 153 via a state 163 in which the content is moving, receiving a move end notification.

During the normal state 153, when any one content is selected and a copy is commanded (Copy ( )), the state makes transition to the normal state 153 via a state 164 of copy processing of the content, receiving a copy end notification.

During the normal state 153, when any one content is selected and rotation processing is commanded (RotX, RotY, RotZ ( )), the state makes transition to the normal state 153 via a state 165 of rotation processing of the content, receiving an end notification corresponding to RotX, RotY or RotZ.

During the normal state 153, when any one content is selected and a zoom (zoom-in or zoom-out) is commanded (Zoom ( )), the state makes transition to the normal state 153 via a state 166 of zoom processing of the content (zoom-in processing or zoom-out processing), receiving zoom end notification.

During the normal state 153, when a search of contents is commanded (Seek ( )) such as a case when a scroll is commanded in a contents list display state, the state makes transition to the normal state 153 via a state 167 of displaying contents, receiving a seek end notification.

During the normal state 153, when an end corresponding to one of application programs 91-*n* (Destroy ( )) is commanded, the application program ends via an end processing state 168.

Accordingly, states of applications 91-1 to 91-*n* are defined without depending on the system by the state definition module 92. Though the state definition is not dependent on the system, the actual operation is different according to, for example, a decode function included in the decoding processing unit 42. However, the applications 91-1 to 91-*n* are capable of possessing portability not dependent on the system because state transitions are defined without depending on the system by the state definition module 92.

The respective normal states shown surrounded by heavy lines in FIG. 3 and FIG. 4 are states in a system (hardware), that is, in this case, states in the information processing apparatus 1 in which application programs are activated, specifically, states of the system which are handled by processing of the play processing application 81 controlled by the system control unit 11.

It is necessary that, in the case that a state transition is requested by any one of applications 91-1 to 91-*n*, the state definition module 92 notifies the system of a request for the state transition, and when the state definition of the system ends, an end notification is notified to corresponding one of the applications 91-1 to 91-*n*.

However, in applications 91-1 to 91-*n* and the system (in this case, the play processing application 81), functions (commands) and state definitions which can be recognized are different, even when functions (commands) respectively recognized by them are transmitted, a party received the function (command) is not able to recognize a request or a notification as it is.

The interface module 93 absorbs the difference between the application and the platform by defining an interface between the state definition of the application defined by the state definition module 92 and the state definition in the actual system (apparatus). That is, the interface module 93 is dependent on a platform or a system, therefore, by designing the interface module 93 according to the platform or the system, the state definition module 92 and the applications 91-1 to 91-*n* which are upper layers than the interface module 93 can be used in common, not depending on the platform or the system.

Specifically, the interface module 93 grasps the correspondence between commands which can be recognized by the application and commands which can be recognized by the system. When a command for a state transition is supplied from the application, the interface module 93 converts the command into the one which can be recognized by the system, then, supplies it to the interface system 94 to be notified to the play processing application 81. The interface module 93 also, when a request for a state transition from the system such as a case that the system receives an operation input by a user, converts the command into the one which can be recognized by the application, then, supplies it to the state transition module 92.

The interface module 93 can grasp the relation between state definitions and commands which can be recognized by the application and state definitions and commands which can be recognized by the system in any method, however, for example, it is preferable to register a correspondence table showing correspondences of commands (functions) which can be recognized respectively according to the state definitions of the application defined by the state definition module 92, as shown in FIG. 5.

In the normal states shown surrounded by heavy lines in FIG. 3, commands which can be recognized by the application in a state in which a medium is not set are an Open ( ) command and a Destroy ( ) command. The interface module 93 respectively registers commands which can be recognized by the system and state transitions by these commands, which correspond to these commands. Needless to say, since the command which can be recognized by the system is dependent on the system, the interface module 93 registers different commands according to the corresponding system. The command which can be recognized by the application and the command which can be recognized by the system do not always correspond to each other in a one to one relation. For example, it is possible that plural commands which can be recognized by the system correspond to one command which can be recognized by the application, or plural commands which can be recognized by the application correspond to one command which can be recognized by the system.

Similarly, in the normal states shown surrounded by heavy lines in FIG. 3, commands which can be recognized by the application in a stop state are a Close ( ) command, a Play ( ) command and a Seek ( ) command. The interface module 93 respectively registers commands which can be recognized by the system, which correspond to these commands. Also, in the normal states shown surrounded by heavy lines in FIG. 3, commands which can be recognized by the application in a playing state are a Stop command ( ), a Play ( ) command, a Seek ( ) command and a Pause ( ) command. Additionally, commands which can be recognized by the application in a pause state are a Stop ( ) command, a Play ( ) command and a Seek ( ) command. The interface module 93 respectively resisters commands which can be recognized by the systems, which correspond to these commands.

That is to say, the interface module 93 can mediate between the application layer and the system layer (as well as the system to be connected) by converting commands giving and receiving between the state definition module 92 and the interface system 94 into commands which can be recognized by the application 91 not dependent on the platform or the system and by the play processing application 81 respectively, based on the correspondence table shown in FIG. 5.

The interface (I/F) system 94 corresponds to the system layer, interfacing information to the play processing application 81 (that is, the application controlling processing of the system) executed at the system control unit 11.

Communication between the system control unit 11 and the application control unit 61 can be a bottleneck, therefore, it should be reduced as few as possible. The state definition module 92 handles state definitions and the like of the application, which are in the abstract layer, therefore, communication of unnecessary commands can be filtered according to the state definition.

Specifically, for example, in the state definitions explained using FIG. 3, since a moving picture or a music content to be an operation target is not designated in the state in which a medium is not set, the play processing application 81 operated by the system control unit 11 can only execute processing of the Open ( ) and the Destroy ( ) and even when receiving requests of the Play ( ) which plays contents and the like, it is not able to execute such requests. Therefore, the state definition module 92 filters commands which are not able to be executed by the play processing application 81 operated at the system control unit 11 in the present state, not transmitting the commands to the system control unit 11, and notifies errors to the application 91.

Figure 6:
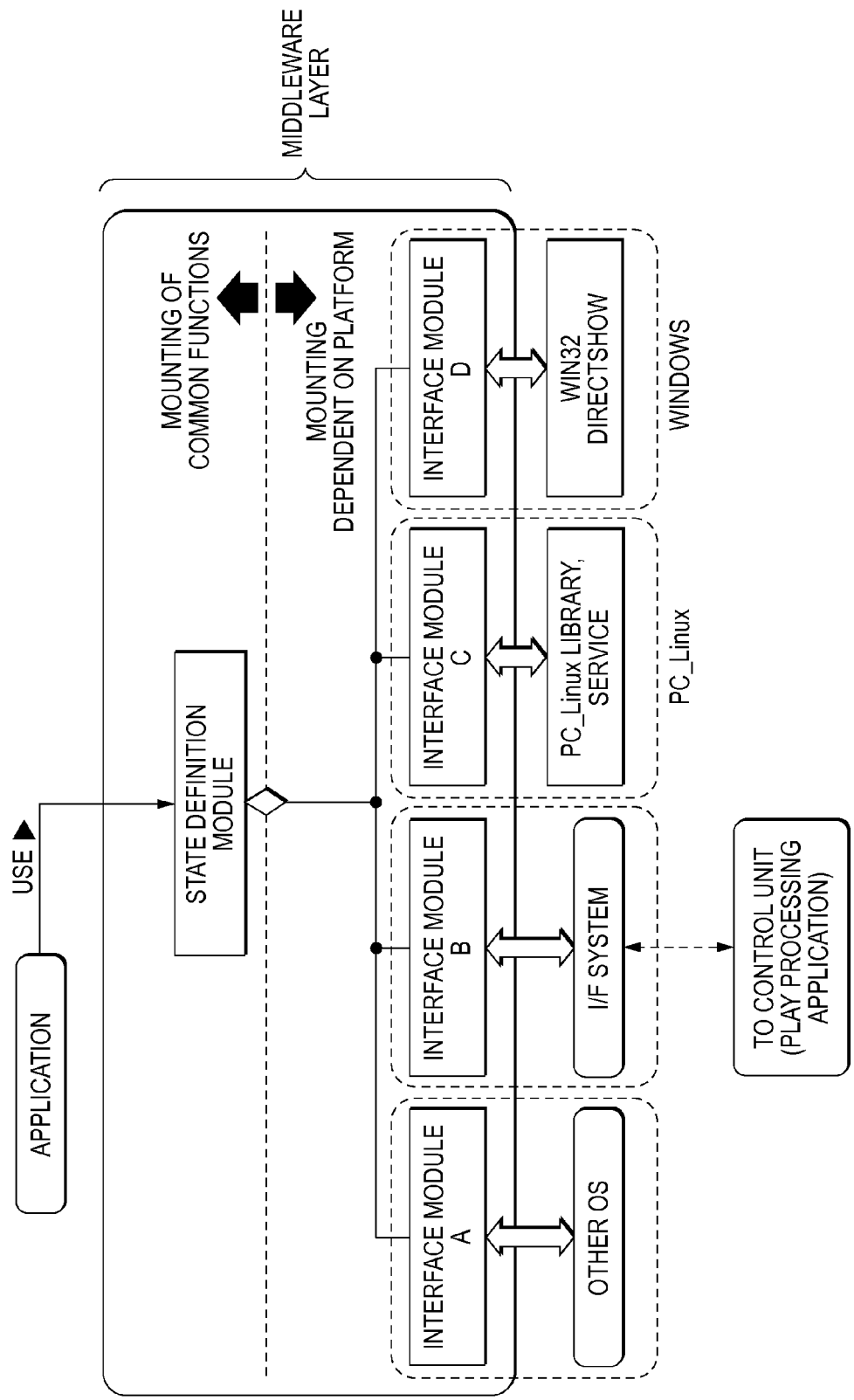
FIG. 6 is a diagram explaining portability of applications.

By mounting the middleware layer explained using FIG. 2, the applications 91-1 to 91-$n$ which are designed based on a framework of the state definition module 92 can be used also in other platforms. As shown in FIG. 6, the interface modules 93 are designed based on the systems, which allows then to mediate giving and receiving of the command and the like between respective systems and the state definition module 92, accordingly, it becomes possible that the applications 91-1 to 91-$n$ designed based on the framework of the state definition module 92 and the state definition module 92 are commonly mounted regardless of platforms or systems.

Next, with reference to FIG. 7, processing executed by the state definition module 92 and the interface module 93 to which the invention is applied will be explained.

In step S1, the state definition module 92 judges whether receiving an input of a command from any one of the applications 91-1 to 91-$n$ or not. In step S1, when it is judged that the input of the command is not received, the processing of step S1 is repeated until it is judged that the input of the command is received.

In step S1, when it is judged that the input of the command is received, in step S2, the state definition module 92 judges whether a state transition from the present state is possible or not. Specifically, for example, in the state transitions explained using FIG. 3, in the state in which a content is not selected at present, the state transition is not able to be performed when receiving the pause command or the play command, however, the state transition is possible when receiving the open command (Open ( )) in which any one content is selected and the file is opened, or the end command (Destroy ( )) of the application 91.

In step S2, when it is judged that the state transition is not possible, the state definition module 92 notifies an error to a corresponding application 91 in step S3, and the process ends.

In step S2, when it is judged the state transition is possible, in step S4, the state definition module 92 supplies the command to the interface module 93. The interface module 93 converts the supplied command into a command format which can be recognized by the play processing application 81 by using, for example, the correspondence table of the commands explained with reference to FIG. 5.

In step S5, the interface module 93 supplies the converted command to the interface system 94 to control the supply to the play processing application 81. Since the interface system 94 supplies the play processing application 81 with the command converted into the command format which can be recognized by the play processing application 81, the play processing application 81 executes processing based on the supplied command.

In step S6, the interface module 93 judges whether a state transition processing end notification is supplied from the play processing application 81 through the interface system 94 or not. In step S6, when it is judged that the state transition processing end notification is not supplied, the processing of step S6 is repeated until it is judged that the state transition processing end notification is supplied.

In step S6, when it is judged that the state transition processing end notification is supplied, in step S7, the interface module 93 converts the state transition processing end notification into a function which can be recognized by the state definition module 92, and supplies it to the state definition module 92. The state definition module 92 recognized the state after transition and notifies it to the corresponding application in the applications 91-1 to 91-$n$ to end the process.

Accordingly, giving and receiving of commands and notifications are performed between the applications 91-1 to 91-$n$ which are not dependent on the system and the play processing application 81 which controls the system, therefore, it is possible to design application programs without depending on the system. That is, the portability of application programs can be secured.

Since the application program thus designed based on state transitions defined by the state definition module 92 is not dependent on the system, it is not necessary to consider the system when updating the application by providing the interface module 93 which mediates between the state definition module 92 and the system, therefore, the update of the application can be easier, in other words, degrees of freedom of hardware which can use application programs designed based on state transitions defined by the state definition module 92, and an API (Application Program Interface) hiding the hardware increase.

Furthermore, by defining the state by the state definition module 92 and preventing giving and receiving of commands whose state transitions are not possible, unnecessary communication can be reduced between the application control unit 61 and the system control unit 11.

Accordingly, by applying the invention, in a multimedia application program handling moving pictures, still pictures, music and the like, which operates with an application program controlling the system, the difference between characteristics of hardware of the apparatus and specifications of the application can be absorbed in the middleware (in this case, the state definition module 92 and the interface module 93), therefore, portability of the application can be improved.

In the middleware (in this case, the state definition module 92 and the interface module 93), an interface, error codes and events of a general-purpose multimedia application are defined, and state transitions of the application which has been conventionally defined by the application are managed. By designing the application according to an abstract layer of the middleware, portability of the application is improved and degree of freedom of hardware is also improved.

Further, in the middleware (in this case, the state definition module 92 and the interface module 93), behavior of the application is managed in the upper layer, therefore, giving and receiving of commands, notifications and the like between the application and the hardware are filtered to reduce unnecessary communication.

The above series of processing can be executed by software. The software is installed from recording media to a computer in which programs included in the software are incorporated in dedicated hardware, or for example, a general-purpose personal computer which can execute various functions by installing various programs.

The recoding media includes, as shown in FIG. 1, the removable media 50 and the like such as a magnetic disk (including a flexible disk), an optical disk (including a CD-ROM (Compact Disk-Read Only Memory), a DVD (Digital Versatile Disk), a magneto-optical disk (including a MD (Mini-Disk) (Registered Trademark of Sony Corporation)) or a semiconductor memory, which records programs, distributed for providing programs to users, in addition to the computer.

In the specification, the step of describing a program to be recorded in the recording media includes not only processing performed in time series along the described order but also includes processing not always performed in time series but executed in parallel or individually.

In the specification, the system represents the whole apparatus including plural devices.

The embodiment of the invention is not limited to the above embodiment, but can be variously modified within the scope not departing from the gist of the invention.

As described above, according to the embodiment of the invention, applications can be executed, particularly, states of applications not dependent on the system are defined and controlled, and when a command instructing a state transition is issued, the command is converted into a format which can be recognized by the system, as a result, portability of applications can be improved.

It should be understood by those skilled in the art that various modifications, combinations, sub-combinations and alterations may occur depending on design requirements and other factors insofar as they are within the scope of the appended claims or the equivalents thereof.

The invention claimed is:

1. A information processing method of an information processing apparatus capable of executing applications, comprising the steps of:
   controlling a system of the information processing apparatus,
   controlling the execution of the applications,
   receiving a command instructing a state transition of the application,
   judging whether a transition of a defined state is possible or not in accordance with a command, based on the state definition of the application not dependent on the system and a defined state of the application not dependent on the system when the command instructing a state transition is received, and
   converting the command into a format which can be recognized by the system when the state transition is judged to be possible.

2. A non-transitory recording medium on which is recorded a program which is incorporated in a designated system and can be executed by a computer controlling execution of applications not dependent on the system, the program allows the computer to execute processing including the steps of:
   receiving a command instructing a state transition of the application,
   judging whether a transition of a defined state is possible or not in accordance with the command, based on the state definition of the application not dependent on the system and a defined state of the application not dependent on the system when the command instructing a state transition is received, and
   converting the command into a format which can be recognized by the system when the state transition is judged to be possible.

\* \* \* \* \*